United States Patent
Li et al.

(10) Patent No.: US 10,534,771 B2
(45) Date of Patent: Jan. 14, 2020

(54) DATABASE ACCESS METHOD AND APPARATUS, AND DATABASE SYSTEM

(71) Applicant: Huawei Technologies Co., Ltd., Shenzhen, Guangdong (CN)

(72) Inventors: Zhenfeng Li, Nanjing (CN); Zhongchu Zhu, Shenzhen (CN); Jianxun Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 15/411,043

(22) Filed: Jan. 20, 2017

(65) Prior Publication Data

US 2017/0132280 A1    May 11, 2017

Related U.S. Application Data

(63) Continuation of application No. PCT/CN2015/083996, filed on Jul. 14, 2015.

(30) Foreign Application Priority Data

Jul. 23, 2014 (CN) .......................... 2014 1 0353970

(51) Int. Cl.
  *G06F 16/2453* (2019.01)
(52) U.S. Cl.
  CPC .............................. *G06F 16/24534* (2019.01)
(58) Field of Classification Search
  CPC ...... G06F 8/65; G06F 16/3344; G06F 17/271; G06F 8/427; G06F 8/72; G06F 9/4493;
  (Continued)

(56) References Cited

U.S. PATENT DOCUMENTS 6,598,044 B1   7/2003 Waas et al.
7,552,467 B2 * 6/2009 Lindsay .................. G06F 21/31
                                                    726/5
(Continued)

FOREIGN PATENT DOCUMENTS

CN          1441365 A    9/2003
CN        101706810 A    5/2010
(Continued)

OTHER PUBLICATIONS

EE-Peng Lim et al., "An Algebraic Transformation Framework for Multidatabase Queries", Jul. 31, 1995, pp. 273-307, XP055360605.
(Continued)

*Primary Examiner* — Angelica Ruiz
(74) *Attorney, Agent, or Firm* — Leydig, Voit & Mayer, Ltd.

(57) ABSTRACT

The present invention provides a database access method, where the method includes the following steps: receiving an access request input by a client, where the access request includes at least one command statement; performing rule matching between the command statement included in the access request and a rule in a preset rule set, and performing transformation processing on a statement that is included in the access request and that matches the rule, so as to generate a sinking statement that satisfies an execution requirement of a data source, where the sinking statement is a statement that is delivered to a database and executed by the data source; and transmitting the sinking statement to the database to which the sinking statement points. The present invention further provides a database access apparatus and a database system to which the foregoing method is applied.

9 Claims, 5 Drawing Sheets

(58) Field of Classification Search
CPC ........... G06F 11/3604; G06F 16/24534; G06F 16/3337; G06F 17/272; G06F 17/2872; G06F 17/289
USPC ........... 707/600–831, 899, 999.001–999.206
See application file for complete search history.

(56) References Cited

U.S. PATENT DOCUMENTS

| | | | |
|---|---|---|---|
| 8,621,649 B1* | 12/2013 | Van Dijk | H04L 29/06 |
| | | | 713/150 |
| 2011/0078211 A1* | 3/2011 | Gass | G06F 8/65 |
| | | | 707/803 |
| 2011/0282995 A1* | 11/2011 | Gass | G06F 8/65 |
| | | | 709/226 |
| 2011/0283269 A1* | 11/2011 | Gass | G06F 8/65 |
| | | | 717/168 |
| 2011/0295839 A1 | 12/2011 | Collins et al. | |
| 2011/0296391 A1* | 12/2011 | Gass | G06F 8/36 |
| | | | 717/168 |
| 2013/0311444 A1 | 11/2013 | Samwel et al. | |

FOREIGN PATENT DOCUMENTS

| | | |
|---|---|---|
| CN | 101901222 A | 12/2010 |
| CN | 102073640 A | 5/2011 |
| CN | 103678589 A | 3/2014 |
| CN | 103678621 A | 3/2014 |

OTHER PUBLICATIONS

EE-Peng Lim et al., "Myriad: Design and Implementation of a Federated Database Prototype", Software-Practice and Experience, vol. 25(3), pp. 533-562, May 31, 1995, XP000655513.

* cited by examiner

DATABASE ACCESS METHOD AND APPARATUS, AND DATABASE SYSTEM

CROSS-REFERENCE TO RELATED APPLICATIONS

This application is a continuation of International Application No. PCT/CN2015/083996, filed on Jul. 14, 2015, which claims priority to Chinese Patent Application No. 201410353970.X, filed on Jul. 23, 2014, the disclosures of the aforementioned applications are hereby incorporated by reference in their entireties.

TECHNICAL FIELD

The present invention relates to the database field, and in particular, to a database access method and apparatus, and a database system.

BACKGROUND

With development of information technologies, centralized construction and Internet-oriented transformation of an operator IT system, enhancement of an integrated application of enterprise data, and wide deployment of Internet communities (such as facebook and twitter) and Internet services (such as microblog, reading, games, and e-commerce), a database system needs to process an increasingly large amount of data, and a conventional centralized database is becoming increasingly incapable of adapting to a current requirement. Therefore, a data processing manner is changing from centralization to distribution.

A distributed database system generally includes multiple independent computer systems. Each computer may be independently placed in one place, and each computer has a complete copy of a database management system and has a partial local database of the computer. Many computers located in different places are connected by using a network, so as to jointly form a complete and global large database.

As one of outstanding distributed database systems, a federated database technology provides a uniform user access interface, and shields a difference between a sub-database of a database and a partition of the database and a difference between different databases; when accessing data by using a federated database system, a user finds it as easy as accessing an actually existing database. However, because cross-database processing is involved, a federated database has problems such as a low processing speed and easily occurred lock contention and resource conflicts. Therefore, a problem that the federated database or a distributed database system similar to the federated database needs to resolve focuses on how to improve processing efficiency.

For the federated database, the key to improve the processing efficiency is to optimize a structured query language (SQL) and output an optimal execution solution. A current solution, used to optimize the SQL, of the federated database may sometimes be confronted with a situation in which data in a data table is re-hashed or is broadcast in an entire network, which causes problems such as a large network traffic, and large occupation, caused by data insertion in each data source, of a processor and a memory, thereby leading to a low data processing speed, reduction in concurrency processing performance of a system, and a response delay, so that a use requirement cannot be satisfied.

SUMMARY

For the foregoing problems, the present invention aims to provide a database access method, where a rule set corresponding to an SQL is preset, and a transformed statement that satisfies an execution requirement of a data source is generated after rule matching and transformation processing are performed on the SQL, so that a data processing capability of the data source can be utilized to a maximum extent, and processing performance of a system can be improved, thereby avoiding problems such as a large network traffic and a low data processing speed that are caused by data hashing.

According to a first aspect, the present invention provides a database access method, including the following steps:

receiving an access request input by a client, where the access request includes at least one command statement;

performing rule matching between the command statement included in the access request and a rule in a preset rule set, and performing transformation processing on a statement that is included in the access request and that matches the rule, so as to generate a sinking statement that satisfies an execution requirement of a data source, where the sinking statement is a statement that is delivered to a database and executed by the data source; and transmitting the sinking statement to the database to which the sinking statement points.

In a first possible implementation manner of the first aspect, after the receiving an access request input by a client, the method further includes:

performing lexical and syntax parsing and verification on the access request.

In a second implementation manner of the first aspect, the performing rule matching between the command statement included in the access request and a rule in a preset rule set, and performing transformation processing on a statement that is included in the access request and that matches the rule, so as to generate a sinking statement that satisfies an execution requirement of a data source includes:

(1) searching, according to a command statement included in the access request, for a rule set that is set for the command statement, where the rule set includes at least one rule;

(2) performing rule matching between the command statement and each rule in the found rule set one by one, and when the command statement includes a statement that matches any rule in the rule set, performing transformation processing on the command statement;

(3) re-performing rule matching between a command statement obtained after transformation processing and the each rule in the rule set one by one, and when the command statement obtained after transformation processing includes a statement that matches any rule in the rule set, repeatedly performing transformation processing on the command statement obtained after transformation processing, until the command statement obtained after transformation processing does not include a statement that matches any rule in the rule set; and (4) generating an execution plan after steps (1) to (3) are separately executed for another command statement included in the access request, where the execution plan includes a transformation source access request and the sinking statement that satisfies the execution requirement of the data source.

With reference to the second possible implementation manner of the first aspect, in a third implementation manner of the first aspect, after the transmitting the sinking statement to the database to which the transformed statement points, the method further includes:

collecting a data record that is extracted from the database after the data source executes the sinking statement, and processing the data record in a manner specified in the transformation source access request, to obtain a processing result; and sending the processing result to the client.

According to a second aspect, the present invention provides a database access apparatus, including:

a receiving unit, configured to receive an access request input by a client, where the access request includes at least one command statement;

a processing unit, configured to: perform rule matching processing between the command statement included in the access request and a rule in a preset rule set, and perform transformation processing on a statement that is included in the access request and that matches the rule, so as to generate a sinking statement that satisfies an execution requirement of a data source; and an execution unit, configured to transmit the sinking statement to a database to which the sinking statement points.

In a first possible implementation manner of the second aspect, the apparatus further includes a parsing unit and a verification unit, where the parsing unit is configured to parse the access request, to obtain the command statement in the access request, a command keyword included in the command statement, a statement corresponding to the command keyword, and a data object in the statement; and the verification unit is configured to verify whether the command statement and the command keyword are valid or correct, and if the command statement and the command keyword are valid or correct, instruct the processing unit, where the processing unit executes the step of performing rule matching between the command statement included in the access request and a rule in a preset rule set.

With reference to the first possible implementation manner of the second aspect, in a second possible implementation manner of the second aspect, the apparatus further includes: a rule set unit, configured to set the rule set.

With reference to the second possible implementation manner of the second aspect, in a third possible implementation manner of the second aspect, the processing unit includes a selection unit, a matching unit, and a transformation unit, where the selection unit selects, from the rule set unit according to the command keyword obtained by means of parsing by the parsing unit, a rule set that is set for the command keyword; the matching unit performs rule matching between the command statement corresponding to the command keyword and each rule in the rule set one by one, and when the command statement includes a statement that matches any rule in the rule set, instruct the transformation unit to perform transformation processing on the command statement, where after the matching unit re-performs rule matching between a command statement obtained after transformation processing and the each rule in the rule set one by one, until the command statement does not include a statement that matches any rule in the rule set, an execution plan is generated, and the execution plan includes a transformation source access request and the sinking statement that satisfies the execution requirement of the data source.

With reference to the third possible implementation manner of the second aspect, in a fourth possible implementation manner of the second aspect, the apparatus further includes an output unit, where the execution unit is further configured to: receive the transformation source access request, process, after collecting a data record obtained by the data source by executing the sinking statement, the data record in a manner specified in the transformation source access request, and generate a processing result; and the output unit collects the processing result, and outputs the processing result to the client.

According to a third aspect, an embodiment of the present invention provides a database system, where the database system includes at least one client, at least two databases, and the database access apparatus in the second aspect and any one of the first to the fourth implementation manners of the second aspect; the client is configured to send an access request; the database access apparatus is configured to: receive the access request, generate a transformation source access request and several sinking statements after performing rule matching and transformation processing on the access request, and send the sinking statements to databases to which the sinking statements point; and the database access apparatus is further configured to: receive the data record, and after processing the data record according to the transformation source access request and generating a processing result, transmit the processing result to the client.

According to the database access method and apparatus, and the database system provided in the embodiments of the present invention, a rule set including all SQLs that may be possibly used is preset, and a sinking statement that satisfies an execution requirement of a data source is generated after rule matching processing and transformation processing are performed on an input SQL by using the rule set, so that a data processing capability of the data source can be utilized to a maximum extent, and performance of a system can be improved, thereby avoiding problems such as a large network traffic and a low data processing speed that are caused by data hashing, and satisfying a use requirement.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a database access method and apparatus, and a database system, which are used to improve processing efficiency of a distributed database system. Details are separately described in the following.

Figure 1:
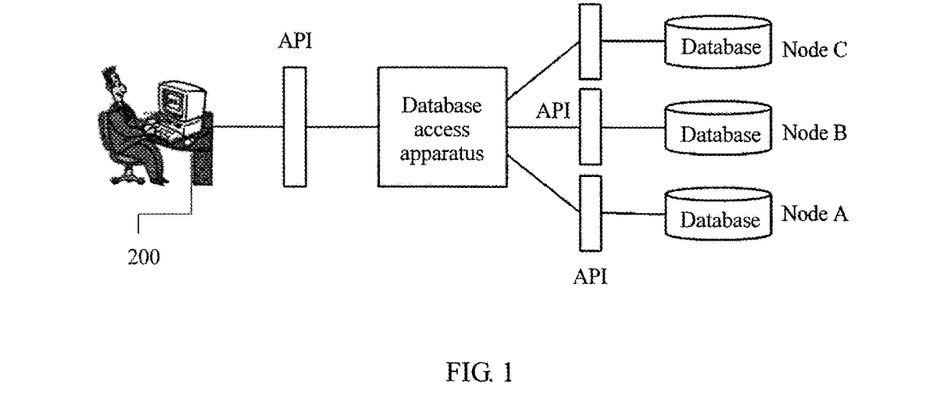
FIG. 1 is a schematic structural diagram of a database system according to an embodiment of the present invention.

To facilitate understanding of the embodiments of the present invention, the database system in the embodiments of the present invention is first described in the following. Referring to FIG. 1, FIG. 1 is a schematic structural diagram of a database system according to an embodiment of the present invention. The database system includes at least one client 200, at least one database access apparatus, and a node queue including at least two physical nodes (such as a Node A, a Node B, and a Node C that are shown in FIG. 1). The client 200, the database access apparatus, and the node queue may implement data transmission by using a local area network, a metropolitan area network, a wide area network, or in a manner specified in another communications protocol. The node has a database, where the database includes at least one data source, and the data source is an object that is in the database and that manages resources such as a data table, a view, and a storage process. For example, the data source is a user (schema) in an Oracle database or a database in a MySQL database. The client 200 sends an access request. After receiving, parsing, and optimizing the access request, the database access apparatus generates an execution plan that includes a sinking statement and a transformation source access request, and sends the sinking statement to a specified database. After executing the sinking statement, the data source in the database acquires, from the database, a data record that satisfies a requirement of the sinking statement, and then transmits the data record to the database access apparatus. The database access apparatus obtains a processing result after processing the data record according to a function defined in the transformation source access request, and transmits the processing result to the client 200.

In this embodiment of the present invention, the client 200 may be a personal computer, and the node may be a database server. The database system further includes an application programming interface (API), where the API may be Java database connectivity (JDBC) or open database connectivity (ODBC), and is used to provide interfaces for transmission of the access request between the database access apparatus and the client 200, and between the database access apparatus and the node queue, so as to implement transmission of the access request between the database access apparatus and the client 200, and between the database access apparatus and the node queue.

Figure 2:
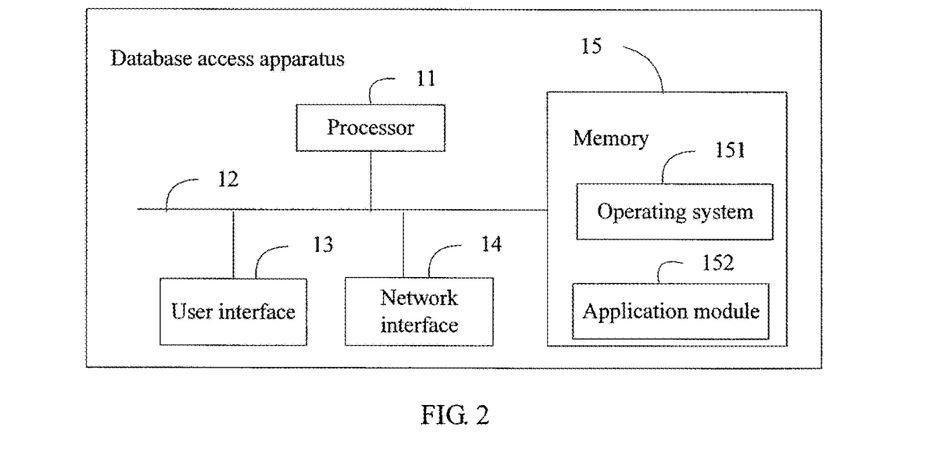
FIG. 2 is a schematic structural diagram of a database access apparatus according to an embodiment of the present invention.

Referring to FIG. 2, FIG. 2 is a schematic structural diagram of a database access apparatus according to an embodiment of the present invention, and the database access apparatus is configured to execute a database access method provided in an embodiment of the present invention. As shown in FIG. 2, the database access apparatus includes: at least one processor 11, such as a CPU; at least one network interface 14 or another user interface 13; a memory 15; and at least one communications bus 12. The communications bus 12 is configured to implement connection and communication between these components. Optionally, the user interface 13 may include a USB interface and another standard interface and wired interface. Optionally, the network interface 14 may include a Wi-Fi interface and another wireless interface. The memory 15 may include a high-speed RAM memory, and may further include a non-volatile memory, for example, at least one disk memory. Optionally, the memory 15 may include at least one storage device that is far from the processor 11.

In some implementation manners, the memory 15 stores the following elements, and an executable module or a data structure, or a subset thereof, or an extended set thereof:

an operating system 151, including various system programs, which are used to implement various basic services and process hardware-based tasks; and an application module 152, including various application programs, such as a device control service program and a device identification service program, which are used to implement various application services.

Specifically, the processor 11 is configured to invoke a program stored in the memory 15 to implement the following operations:

receiving an access request input by a client, where the access request includes at least one command statement;

performing rule matching between the command statement included in the access request and a rule in a preset rule set, and performing transformation processing on a statement that is included in the access request and that matches the rule, so as to generate a sinking statement that satisfies an execution requirement of a data source, where the sinking statement is a statement that is delivered to a database and executed by the data source; and transmitting the sinking statement to the database to which the sinking statement points.

In the foregoing technical solution, a database access apparatus performs rule matching processing between a rule in a rule set preset by the database access apparatus and a command statement included in an access request, and performs transformation processing on the statement that is included in the access request and that matches the rule, so as to generate a sinking statement, where the sinking statement is obtained after optimization and transformation processing is performed on an input access request, and is a sinking statement that has a largest granularity and that is delivered to each data source for processing, so that a data processing capability of the data source can be utilized to a maximum extent, and processing performance of a system can be improved.

In another embodiment, the processor 11 may be further configured to execute the following operations:

receiving an access request input by a client, where the access request includes at least one command statement;

performing syntax parsing and verification on the access request;

performing rule matching between the command statement included in the access request and a rule in a preset rule set, and performing transformation processing on a statement that is included in the access request and that matches the rule, so as to generate a sinking statement that satisfies an execution requirement of a data source, where the sinking statement is a statement that is delivered to a database and executed by the data source;

transmitting the sinking statement to the database to which the sinking statement points;

collecting a data record that is extracted from the database after the data source executes the sinking statement, and processing the data record in a manner specified in a transformation source access request, to obtain a processing result; and sending the processing result to the client.

In the foregoing technical solution, a database access apparatus performs rule matching processing between a rule in a rule set preset by the database access apparatus and a command statement included in an access request, and performs transformation processing on the statement that is included in the access request and that matches the rule, so as to generate a sinking statement, where the sinking statement is obtained after optimization and transformation processing is performed on an input access request, and is a sinking statement that has a largest granularity and that is delivered to each data source for processing, so that a data processing capability of the data source can be utilized to a maximum extent, and processing performance of a system can be improved.

To describe the embodiments of the present invention more clearly, the following describes in detail operation processes of performing the foregoing two embodiments by the database access apparatus.

Figure 3:
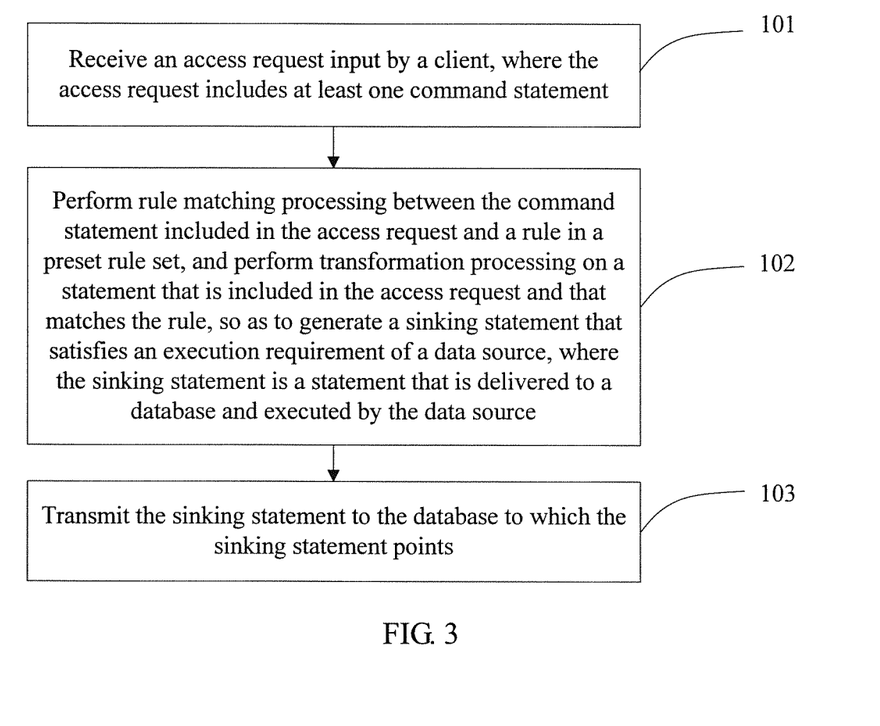
FIG. 3 is a schematic flowchart of a database access method according to an embodiment of the present invention.

Referring to FIG. 3, FIG. 3 is a schematic flowchart of a database access method according to an embodiment of the present invention, where the method includes at least the following steps:

101. Receive an access request input by a client, where the access request includes at least one command statement.

In this embodiment of the present invention, after separately establishing a connection with the client 200 and the node queue, the database access apparatus receives an access request that is sent by the client 200 by running a specific application program (such as a database access program) stored in a memory of the client 200, where the access request may be an SQL, and the SQL includes at least one command statement, so as to perform a corresponding operation on a database in the node queue by using the command statement, for example, perform an access operation such as conditional querying, ordering, or summation on data in the database by using the command statement.

102. Perform rule matching processing between the command statement included in the access request and a rule in a preset rule set, and perform transformation processing on a statement that is included in the access request and that matches the rule, so as to generate a sinking statement that satisfies an execution requirement of a data source, where the sinking statement is a statement that is delivered to a database and executed by the data source.

In this embodiment of the present invention, the database access apparatus performs processing such as optimization, parsing, and transformation on the received SQL, to generate an execution plan. Specifically, the database access apparatus correspondingly sets a rule set for each command statement in the SQL, where the rule set includes a rule (such as a transformation rule) corresponding to the command statement, to perform processing such as transformation on the command statement to generate the sinking statement that satisfies the execution requirement of the data source, thereby making full use of a data processing capability of the data source. In addition, the rule in the rule set may be further extended, modified, or updated as understanding deepens.

Specifically, the performing rule matching processing between the command statement included in the access request and a rule in a preset rule set, and performing transformation processing on a statement that is included in the access request and that matches the rule, so as to generate a sinking statement that satisfies an execution requirement of a data source includes the following steps:

(1) Search, according to a command keyword in a command statement included in the access request, for a rule set that is set for the command keyword, where the rule set includes at least one rule.

In this embodiment of the present invention, the access request may include several command statements, and the command statements each include a command keyword. The database access apparatus constructs a rule set for each of the command statements. When the database access apparatus acquires a command statement, the database access apparatus selects, from all rule sets and by using the command keyword, a rule set that is set for the command keyword, where the rule set includes a rule for various types of sinking processing and transformation processing that the command statement may face.

(2) Perform rule matching between the command statement and each rule in the found rule set one by one, and when the command statement includes a statement that matches any rule in the rule set, perform transformation processing on the command statement.

In this embodiment of the present invention, the database access apparatus performs rule matching processing between the rule in the rule set and the command statement one by one. For example, the rule set includes N rules in total: a first rule, a second rule, . . . , an $N^{th}$ rule; the database access apparatus first performs rule matching processing between the command statement and the first rule; if the command statement includes a statement that matches the first rule, the database access apparatus performs transformation processing on the command statement; otherwise, if the command statement does not include a statement that matches the first rule, the database access apparatus performs rule matching processing between the command statement and the second rule. In the rule matching processing process, when it is found that the command statement includes a statement that matches any rule in the rule set, transformation processing is performed on the command statement, where the transformation processing may be changing a form of the command statement, or may be decomposing the command statement into some statements that have a location relationship, or may be simultaneously performing processing of decomposition and form changing on the command statement.

(3) Re-perform rule matching between a command statement obtained after transformation processing and the each rule in the rule set one by one, and when the command statement obtained after transformation processing includes a statement that matches any rule in the rule set, repeatedly performing transformation processing on the command statement obtained after transformation processing, until the transformed command statement does not include a statement that matches any rule in the rule set.

In this embodiment of the present invention, after transformation processing is performed once on the command statement, the database access apparatus re-performs rule matching processing (rule matching processing is still performed from the first rule) between the command statement obtained after transformation processing and all rules in the rule set, and when the command statement obtained after transformation processing includes a statement that matches any rule in the rule set, repeatedly performing transformation processing on the command statement obtained after transformation processing, until the command statement obtained after transformation processing does not include a statement that matches any rule in the rule set. In this case, it indicates that a rule matching and transformation processing process performed on the command statement is completed.

(4) Generate an execution plan after steps (1) to (3) are separately executed for another command statement included in the access request, where the execution plan includes a transformation source access request and the sinking statement that satisfies the execution requirement of the data source.

In this embodiment of the present invention, after the database access apparatus completes rule matching and transformation processing on one command statement, the database access apparatus acquires a next command statement, selects a rule set that is set for the next command statement, and subsequently repeatedly executes the foregoing step of rule matching and transformation processing, until rule matching and transformation processing are performed on all command statements in the access request, so as to generate the execution plan, where the execution plan includes the transformation source access request and several sinking statements that satisfy the execution requirement of the data source, where sinking is an operation process of delivering an SQL to a database in a node queue. The sinking statement is a part or all of the command statements that are separated from the access request after rule matching and transformation processing are performed. The sinking statement may further include a statement obtained after transformation is performed on the command statement, such as a statement obtained after transformation processing such as changing of a function name in the command statement. The sinking statement itself is an independent SQL and therefore may be delivered to the database in the node queue and may be executed by a data source of the database. Because the foregoing rule matching and transformation processing are performed on the sinking statement, when executing the sinking statement, the data source only needs to complete local data processing according to the sinking statement, and does not need to perform cross-database or cross-partition processing.

103. Transmit the sinking statement to the database to which the sinking statement points.

In this embodiment of the present invention, a database access apparatus transmits several sinking statements in the transformed statement to databases to which the sinking statements point. A data source in the database may execute a sinking statement. Because the sinking statement is a statement that has a largest granularity and that is delivered to each data source for processing, a data source in the node queue only needs to complete local data processing according to the sinking statement, and does not need to perform cross-database or cross-partition processing, so that a data processing capability of the data source can be utilized to a maximum extent, and processing performance of a system can be improved.

In the foregoing technical solution, the database access apparatus performs rule matching processing between the rule in the rule set preset by the database access apparatus and the command statement included in the access request, and performs transformation processing on the statement that is included in the access request and that matches the sinking rule, so as to generate the sinking statement that satisfies the execution requirement of the data source. When processing data by using the sinking statement, the data source has high processing efficiency, and occupies a small amount of network traffic, which brings better user experience.

Figure 4:
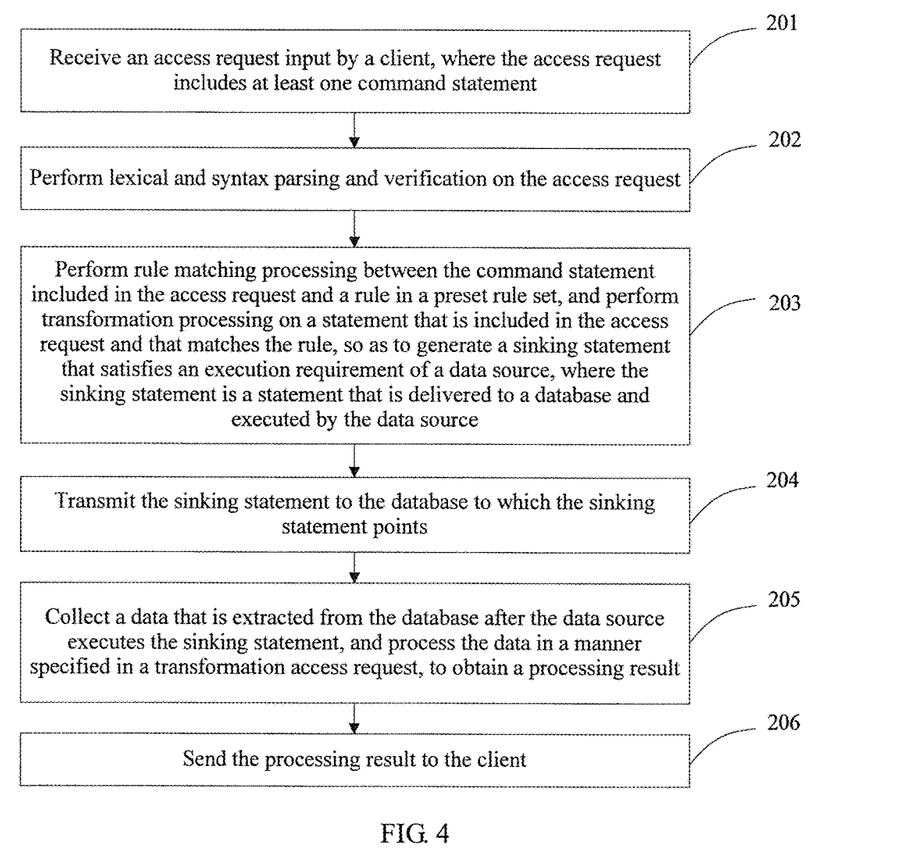
FIG. 4 is a schematic flowchart of another database access method according to an embodiment of the present invention.

Referring to FIG. 4, FIG. 4 is a schematic flowchart of another database access method according to an embodiment of the present invention.

201. Receive an access request input by a client, where the access request includes at least one command statement.

202. Perform lexical and syntax parsing and verification on the access request.

Specifically, the performing lexical and syntax parsing and verification on the access request includes:

parsing the access request, so as to obtain a command keyword included in the command statement, a statement corresponding to the command keyword, and a data object in the statement; and verifying whether the command keyword, the statement, and the data object are valid or correct.

In this embodiment of the present invention, after parsing an SQL, the database access apparatus performs lexical and syntax verification on the SQL; for example, the database access apparatus may verify whether spelling of the command keyword included in the input access request is wrong, whether a structure of the statement is valid, whether the data object exists, and the like. When the database access apparatus finds, in a verification process, that there is an incorrect or invalid statement in the access request, the database access apparatus ends access requested in the current access request, returns error information to the client 200, and prompts a user to perform modification according to the error information; when the database access apparatus finds, in the verification process, that there is no incorrect or invalid statement in the access request, the database access apparatus executes a next step.

203. Perform rule matching processing between the command statement included in the access request and a rule in a preset rule set, and perform transformation processing on a statement that is included in the access request and that matches the rule, so as to generate a sinking statement that satisfies an execution requirement of a data source.

In this embodiment of the present invention, the database access apparatus performs, according to the foregoing parsing result, rule matching and transformation processing on the command statement in the access request to generate an execution plan, where the execution plan includes a transformation source access request and several sinking statements that satisfy the execution requirement of the data source.

204. Transmit the sinking statement to a database to which the sinking statement points.

205. Collect a data record that is extracted from the database after the data source executes the sinking statement, and process the data record in a manner specified in the transformation source access request, to obtain a processing result.

In this embodiment of the present invention, after receiving the sinking statement, the data source executes the sinking statement, for example, performs query and ordering inside the data source, or performs an operation, such as collection processing, on a data record in a partition; the data source returns a data record obtained after the operation to the database access apparatus. After receiving the data record, the database access apparatus processes the data record in the manner specified in the transformation source access request, for example, performs, by using a function (which may be a summation function, an averaging function, a maximum/minimum value solving function, or the like) defined in the transformation source access request, further processing on a data record obtained by each data source, so as to complete a data processing process that involves cross-partition, cross-database, or the like and that each data resource is incapable of completing; the database access apparatus may obtain the processing result after processing the data record.

206. Send the processing result to the client.

In this embodiment of the present invention, the database access apparatus sends the processing result to the client 200, where the processing result is a query result required by the client 200.

To describe a procedure and a processing process that are of the foregoing database access method more clearly, a specific example is used in the following to describe in detail a process of performing rule matching processing and transformation processing on the access request by the database access apparatus.

It is assumed that the access request input by the client 200 is:

SELECT t1.f12, sum(t2.f22),avg(t3.f32)
FROM t1,t2,t3
WHERE t1.f11=t2.f21 and t1.f11=t3.f31
and t1.f11 mod 2=1 and t1.f12=20
GROUP BY t1.f11
ORDER BY t1.f11;

where t1, t2, and t3 are partition tables (a larger data table is decomposed into multiple parts according to a need and a specific rule, for example, according to a time sequence of data storage, where the multiple parts are separately stored in different data sources, and each part obtained after decomposition is a partition table), and all exist in multiple data sources, where each data source is distributed in each database. The table t1 is a table of student information, and includes fields f11 and f12, where f11 is a partition field and f11 represents a student ID, and f12 represents a class ID of a student. The table t2 is a table of student's score, and includes fields f21, f22, and f23, where f21 is a partition field, and f21 represents a student ID, f22 represents a score, and f23 represents a subject, and f21 is a partition field. The table t3 is a table of student's cost, and includes fields f31, f32, and f33, where f31 is a partition field, and f31 represents a student ID, f32 represents a cost of a student, and f33 represents a cost month.

| Table of student information (t1) | | |
| --- | --- | --- |
| Field | f11 | f12 |
| Field meaning | studentId | classid |
| Table of student's score (t2) | | |
| Field | f21 | f22 | f23 |
| Field meaning | studentId | score | subject |
| Table of student's cost (t3) | | |
| Field | f31 | f32 | f33 |
| Field meaning | studentId | cost | month (cost month) |

A meaning of the access request input by the client 200 is querying a student whose class ID is 20 and whose student ID is an odd number, outputting the class ID, a total score of subjects, and an average cost that are of the student, and ordering found results in ascending order according to the student IDs.

When the database access apparatus receives the foregoing access request, the database access apparatus first parses the access request to obtain information such as the command statement included in the access request, the command keyword, the statement, and the data object, and then the database access apparatus verifies the information such as the command keyword, the statement, and the data object to determine whether the access request is valid or correct. In this example, for example, the command statement included in the access request includes: a SELECT list item command statement, a WHERE condition item command statement, a Join command statement, a GROUP command statement, and an ORDER command statement, where a command keyword of the SELECT list item command statement is SELECT, a command keyword of the WHERE condition item command statement is WHERE, and keywords of the GROUP command statement and the ORDER command statement are respectively GROUP BY and ORDER BY.

In this embodiment of the present invention, the database access apparatus first performs whole sinking determining, where the whole sinking is directly sending, to one or more databases in a node queue to which the access request points, the whole access request without performing transformation. A rule in a rule set of the whole sinking stipulates that when data that the access request is to access is located in and is only located in a same partition (that is, partition settings are completely the same), the access request may wholly sink to a database; otherwise, when the data that the access request is to access is located in different partitions, the access request cannot wholly sink to a database. Because the partition field f33 in the table t3 is not a join field (the Join field is f31), the access request does not conform to a whole sinking rule, and cannot sink wholly.

Then, the database access apparatus performs rule matching processing on the WHERE condition item command statement in the access request, and database access apparatus selects a WHERE condition item rule set according to the command keyword WHERE. It is assumed that a rule in the WHERE condition item rule set stipulates that if a condition item is an independent field, and the field is a Join field of a particular partition table, the field may be extended to Join of another partition table. Rule matching is performed between the WHERE condition item command statement and a rule in the WHERE condition item rule set, and after transformation processing, the access request changes into:

[Source SQL obtained after transformation is performed for the first time]
SELECT t1.f12, sum(t2.f22),avg(t3.f32)
FROM t1,t2,t3
WHERE t1.f11=t2.f21 and t1.f11=t3.f31
and t1.f11 mod 2=1 and t2.f21 mod 2=1 and t3.f31 mod 2=1
and t1.f12=20
GROUP BY t1.f11
ORDER BY t1.f11;

That is, "t1.f11=t2.f21 and t1.f11=t3.f31 and t1.f11 mod 2=1 and t2.f21 mod 2=1 and t3.f31 mod 2=1" is obtained after "t1.f11=t2.f21 and t1.f11=t3.f31 and t1.f11 mod 2=1" in the WHERE condition item command statement is extended according to transformation processing in the WHERE condition item rule set.

Then, the database access apparatus performs rule matching processing on the Join command statement (that is, a condition item includes a statement used to Join two tables, for example, t1.f11=t2.f21, the statement implements a Join operation of the table t1 and the table t2, and f11 and f21 are Join fields; or t1.f11=t3.f31, the statement implements a Join operation of the table t1 and the table t3) in the access request, and the database access apparatus selects a Join rule set. It is assumed that a rule in the Join rule set stipulates that Join fields need to be partition fields of two tables, and partition manners of the two tables are consistent. Because a partition manner of the table t1 is consistent with that of the table t2, but is inconsistent with that of the table t3, Join of the table t1 and the table t2 matches a Join sinking rule, but Join of the table t1 and t3 does not match the Join sinking rule. After rule matching and transformation processing are performed between the Join command statement and a rule in the Join rule set, the following is obtained:

[First sinking SQL]
SELECT*FROM t1, t2
WHERE t1.f11=t2.f21 and t1.f11 mod 2=1 and t2.f21 mod 2=1;
and t1.f12=20
[Second sinking SQL]
SELECT*FROM t3
WHERE t3.f31 mod 2=1;
[Source SQL obtained after transformation is performed for the second time]
SELECT tmp1.f12, sum(tmp1.f22), avg(tmp2.f32)
FROM tmp1, tmp2
WHERE tmp1.f11=tmp2.f31
GROUP BY tmp1.f11
ORDER BY tmp1.f11;

where tmp1 is a virtual table after Join is performed between t1 and t2, and tmp2 is a virtual table corresponding to a result after SELECT is performed on the table t3.

Further, the database access apparatus performs rule matching on the GROUP command statement and the ORDER command statement that are in the access request, and the database access apparatus selects a GROUP rule set and an ORDER rule set according to the command keywords GROUP BY and ORDER BY. It is assumed that a rule in the GROUP rule set and the ORDER rule set stipulates that a sinking condition of GROUP and ORDER is that the access request matches the Join sinking rule, and the Join command statement needs to be able to sink completely. It can be learnt from the above that, Join of the table t1 and the table t3 cannot sink, and therefore, the GROOP command statement and the ORDER command statement do not match this rule, and cannot sink.

Finally, the database access apparatus performs rule matching processing on the SELECT list item command statement in the access request, and the database access apparatus selects a SELECT list item rule set according to the command keyword SELECT. It is assumed that the following sinking rules are defined in the SELECT list item rule set in a centralized manner:

(1) An independent field
(2) An independent field function or expression (if necessary, a function name needs to be changed)
(3) Field functions or expressions that can sink together (if necessary, a function name needs to be changed)
(4) A sinking condition of a group field is that Group can sink
(5) For an expression or a function that cannot sink, a field needs to sink After rule matching is performed between the SELECT list item command statement and the SELECT list item rule set, and transformation processing is performed on the SELECT list item command statement, the execution plan may be obtained:

[First sinking SQL]
SELECT t1.f11, t2.f22
FROM t1, t2
WHERE t1.f11=t2.f21 and t1.f11 mod 2=1 and t2.f21 mod 2=1;
and t1.f12=20
[Second sinking SQL]
SELECT f31, f32
FROM t3
WHERE t3.f31 mod 2=1;
[Source SQL obtained after transformation is performed for the third time]
SELECT tmp1.f12, sum(tmp1.f22),avg(tmp2.f32)
FROM tmp1,tmp2
WHERE tmp.f11=tmp2.f31
GROUP BY tmp1.f11
ORDER BY tmp1.f11;

The first sinking SQL and the second sinking SQL are sinking statements that satisfy an execution condition of the data source. The first sinking SQL and the second sinking SQL respectively sink to data sources in which the table t1 and the table t2 are located, and the second sinking SQL sinks to a data source in which the table t3 is located. After executing the sinking statement, the data source extracts a data record corresponding to the sinking statement from the table t1, the table t2, and the table t3 that are in the database, and then returns the data to the database access apparatus. After receiving the data record, the database access apparatus processes the data according to the transformation source access request (that is the source SQL obtained after transformation is performed for the third time), and then obtains a processing result; for example, sum(tmp1.f22) means summing scores, avg (tmp2.f32) means averaging monthly costs, and GROUP BY tmp1.f11 ORDER BY tmp1.f11 means performing grouping processing on obtained data according to student IDs, and ordering the obtained data in ascending order according to the student IDs. Finally, the database access apparatus returns the processing result to the client 200. Because when processing the first sinking SQL and the second sinking SQL, the data source does not need to perform cross-database or cross-partition processing, so that a data processing capability of the data source can be utilized to a maximum extent, and processing performance of a system can be improved.

In the foregoing technical solution, a database access apparatus performs rule matching processing between a rule in a rule set preset by the database access apparatus and a command statement included in an access request, and performs transformation processing on the statement that is included in the access request and that matches a sinking rule, so as to generate a sinking statement that satisfies the execution requirement of a data source; the data source obtains data by executing the sinking statement; the database access apparatus processes the data by using the transformation source access request. Because when executing the data, the data source only needs to process local data, and cross-partition and cross-database processing does not need to be involved, so that a data processing capability of the data source can be utilized to a maximum extent, and processing performance of a system can be improved.

Figure 5:
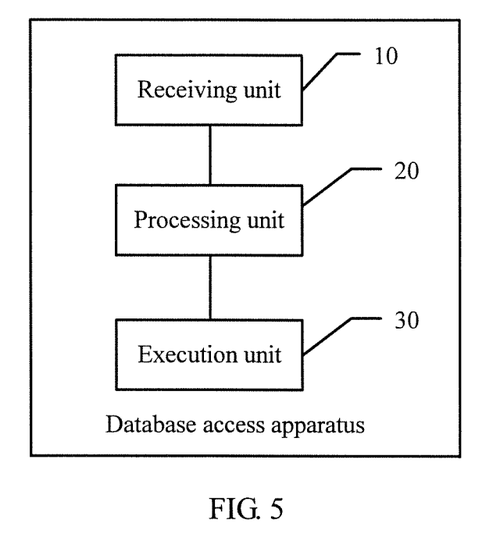
FIG. 5 is a schematic structural diagram of another database access apparatus according to an embodiment of the present invention.
Figure 6:
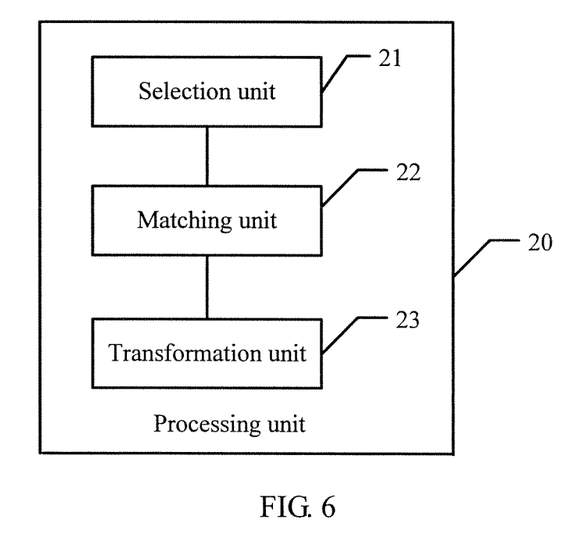
FIG. 6 is a schematic structural diagram of a processing unit shown in the FIG. 5.

Referring to FIG. 5 and FIG. 6, FIG. 5 is a schematic structural diagram of another database access apparatus according to an embodiment of the present invention, where the database access apparatus includes a receiving unit 10, a processing unit 20, and an execution unit 30.

The receiving unit 10 is configured to receive an access request input by a client 200, where the access request includes at least one command statement.

In this embodiment of the present invention, the access request may be an SQL, and the SQL includes at least one command statement, so as to perform a corresponding operation on a database in a node queue by using the command statement, for example, perform an operation such as querying, ordering, or summation on data in the database.

The processing unit 20 is configured to: perform rule matching processing between the command statement included in the access request and a rule in a preset rule set, and perform transformation processing on a statement that is included in the access request and that matches the rule, so as to generate a sinking statement that satisfies an execution requirement of a data source.

In this embodiment of the present invention, the processing unit 20 includes a selection unit 21, a matching unit 22 and a transformation unit 23. The selection unit 21 searches, according to the command statement included in the access request and a command keyword corresponding to the command statement, for a rule set that is set for the command statement. The matching unit 22 performs rule matching processing between the command statement and each rule in the rule set one by one, and when the command statement includes a statement that matches any rule in the rule set, instruct the transformation unit 23 to perform transformation processing on the command statement, and the matching unit 22 re-performs rule matching processing between a command statement obtained after transformation processing and the each rule in the rule set one by one, until the command statement does not include a statement that matches any rule in the rule set, so as to generate a transformed statement, where the transformed statement includes a transformation source access request and the sinking statement that satisfies the execution requirement of the data source.

The execution unit 30 is configured to transmit, to a database to which the sinking statement points, a sinking statement obtained after the processing unit 20 performs processing.

Figure 7:
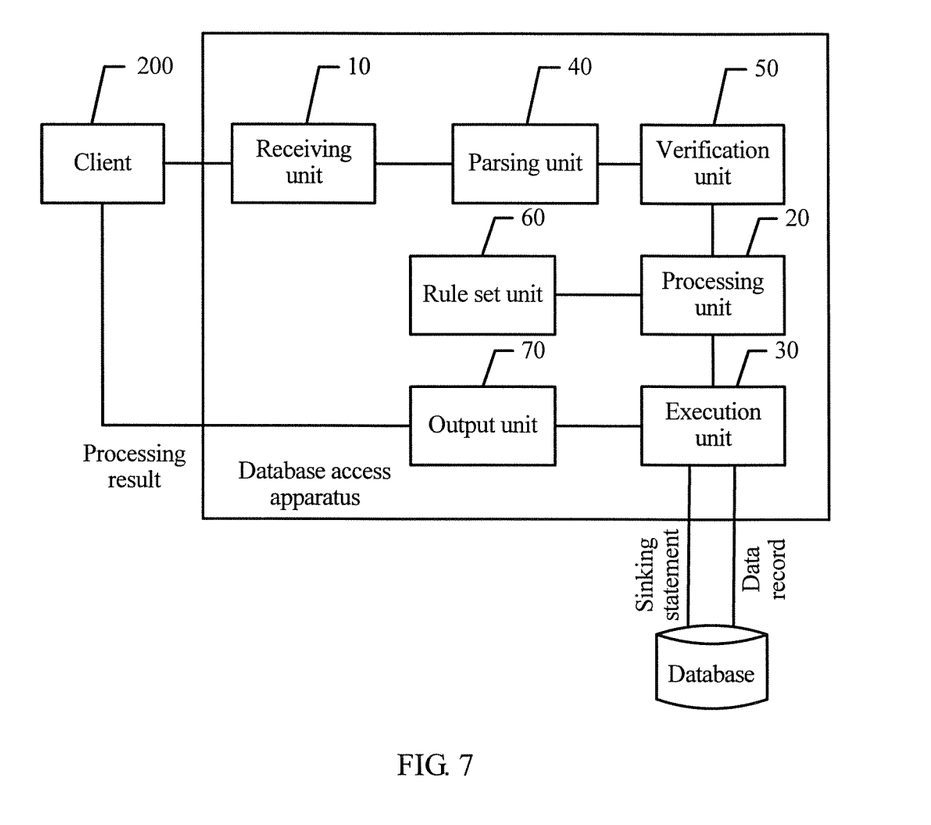
FIG. 7 is a schematic diagram of another database access apparatus, a client, and a database according to an embodiment of the present invention.

Referring to FIG. 7, FIG. 7 is a schematic diagram of another database access apparatus, a client, and a database according to an embodiment of the present invention. In addition to the foregoing receiving unit 10, processing unit 20, and execution unit 30, the database access apparatus further includes a parsing unit 40, a verification unit 50, a rule set unit 60, and an output unit 70.

The parsing unit 40 is configured to: receive an access request input by the receiving unit 10, and parse the access request to obtain a command statement included in the access request, and a command keyword, a statement, and a data object that are corresponding to the command statement.

The verification unit 50 is configured to verify whether the command statement, the command keyword, the statement, and the data object that are obtained by means of parsing by the parsing unit 40 are valid, where the command keyword, the statement, and the data object are corresponding to the command statement.

The rule set unit 60 is configured to set the rule set. The selection unit 21 may select, according to the command keyword, a rule set corresponding to the command keyword from the rule set unit 60.

The execution unit 30 is further configured to receive a transformation source access request that is generated after the processing unit 20 performs transformation processing; after collecting a data record that is obtained by the data source by executing the sinking statement, the execution unit 30 processes the data record according to a manner specified in the transformation source access request, and generates a processing result.

The output unit 70 is configured to send, to the client 200, the processing result generated by the execution unit 30.

In the foregoing technical solution, the processing unit 20 performs rule matching processing and transformation processing on the command statement in the access request, so as to generate the transformation source access request and the sinking statement that satisfies the execution requirement of the data source. The execution unit 30 further acquires the transformation source access request; processes, according to the transformation source access request, a data record returned by the data source after the data source executes the sinking statement; and generates the processing result. Because when executing the sinking statement, the data source does not need to perform a data processing process that involves cross-database, cross-partition, or the like, but transfers the data processing process that involves cross-database, cross-partition, or the like to the execution unit 30 for processing, a data processing capability of the data source can be utilized to a maximum extent, and processing performance of a system can be improved, thereby avoiding problems such as a large network traffic and a low data processing speed that are caused by data hashing.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM for short), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A database access method, comprising:
  receiving an access request input by a client, wherein the access request comprises at least one command statement;
  performing rule matching between the command statement comprised in the access request and a rule in a preset rule set, and performing transformation processing on a statement that is comprised in the access request and that matches the rule for generating a sinking statement that satisfies an execution requirement of a data source, wherein the sinking statement is a statement to be delivered to a database and executed by the data source, wherein performing rule matching between the command statement comprised in the access request and the rule in the preset rule set, and performing transformation processing on the statement that is comprised in the access request and that matches the rule for generating the sinking statement that satisfies the execution requirement of the data source comprises (1) searching, according to the command statement comprised in the access request, for the preset rule set that is set for the command statement, wherein the preset rule set comprises at least one rule; and
  transmitting the sinking statement to the database to which the sinking statement points.

2. The database access method according to claim 1, wherein after receiving the access request input by the client, the method further comprises:

performing lexical and syntax parsing and verification on the access request.

3. The database access method according to claim 1, wherein performing rule matching between the command statement comprised in the access request and the rule in the preset rule set, and performing transformation processing on the statement that is comprised in the access request and that matches the rule for generating the sinking statement that satisfies the execution requirement of the data source further comprises:

(2) performing rule matching between the command statement and each rule in the found preset rule set one by one, and when the command statement comprises a statement that matches any rule in the preset rule set, performing transformation processing on the command statement;

(3) re-performing rule matching between a command statement obtained after transformation processing and the each rule in the preset rule set one by one, and when the command statement obtained after transformation processing comprises a statement that matches any rule in the preset rule set, repeatedly performing transformation processing on the command statement obtained after transformation processing, until the command statement obtained after transformation processing does not comprise a statement that matches any rule in the preset rule set; and (4) generating an execution plan after steps (1) to (3) are separately executed for another command statement comprised in the access request, wherein the execution plan comprises a transformation source access request and the sinking statement that satisfies the execution requirement of the data source.

4. The database access method according to claim 3, wherein after transmitting the sinking statement to the database to which the sinking statement points, the method further comprises:

collecting a data record that is extracted from the database after the data source executes the sinking statement, and processing the data record in a manner specified in a transformation source access request, to obtain a processing result; and sending the processing result to the client.

5. A database access apparatus, comprising:
a processor; and
a non-transitory computer-readable storage medium coupled to the processor and storing programming instructions which, when executed by the processor, cause the processor to:
set a preset set rule set,
receive an access request input by a client, wherein the access request comprises at least one command statement,
perform rule matching between the command statement comprised in the access request and a rule in the preset rule set, and perform transformation processing on a statement that is comprised in the access request and that matches the rule to generate a sinking statement that satisfies an execution requirement of a data source by (1) searching, according to the command statement comprised in the access request, for the preset rule set that is set for the command statement, wherein the preset rule set comprises at least one rule, and
transmit the sinking statement to a database to which the sinking statement points.

6. The database access apparatus according to claim 5, wherein the program codes further comprise instructions which, when executed by the processor, cause the processor to:

parse the access request, to obtain the command statement in the access request, a command keyword comprised in the command statement, a statement corresponding to the command keyword, and a data object in the statement;

verify whether the command statement and the command keyword are valid or correct; and when the command statement and the command keyword are valid or correct, execute the step of performing rule matching between the command statement comprised in the access request and the rule in the preset rule set.

7. The database access apparatus according to claim 5, wherein the program codes further comprise instructions which, when executed by the processor, cause the processor to:

(2) perform rule matching between the command statement corresponding to the command keyword and each rule in the preset rule set one by one, and when the command statement comprises a statement that matches any rule in the preset rule set, perform transformation processing on the command statement;

(3) re-perform rule matching between a command statement obtained after transformation processing and the each rule in the preset rule set one by one, and when the command statement obtained after transformation processing comprises a statement that matches any rule in the preset rule set, repeatedly perform transformation processing on the command statement obtained after transformation processing, until the command statement obtained after transformation processing does not comprise a statement that matches any rule in the preset rule set; and (4) generate an execution plan after steps (1) to (3) are separately executed for another command statement comprised in the access request, wherein the execution plan comprises a transformation source access request and the sinking statement that satisfies the execution requirement of the data source.

8. The database access apparatus according to claim 7, wherein the program codes further comprise instructions which, when executed by the processor, cause the processor to:

receive a transformation source access request;
collect a data record that is extracted from the database after the data source executes the sinking statement;
process the data record in a manner specified in the transformation source access request, to obtain a processing result; and
send the processing result to the client.

9. A database system, comprising:
at least one client configured to send an access request;
at least two databases;
a database access apparatus according to claim 5, wherein the database access apparatus is configured to:
receive the access request,
generate a transformation source access request and at least two sinking statements after performing rule matching and transformation processing on the access request, and
send the at least two sinking statements to the at least two databases to which the sinking statements point;

wherein each database is configured to:
  after receiving the at least two sinking statements, execute at least one of the sinking statements, and
  transmit a data record that is in the database and satisfies a requirement of the at least one sinking statement to the database access apparatus; and
wherein the database access apparatus is further configured to:
  receive the data record; and
  after processing the data record according to the transformation source access request and generating a processing result, transmit the processing result to the client.

\* \* \* \* \*